Patented Dec. 20, 1927.

1,653,452

UNITED STATES PATENT OFFICE.

HARRY E. DUBIN AND HUGH B. CORBITT, OF NEW YORK, N. Y., ASSIGNORS, BY MESNE ASSIGNMENTS, TO H. A. METZ LABORATORIES, INC., OF NEW YORK, N. Y., A CORPORATION OF NEW YORK.

PROCESS OF MAKING A HYPOGLYCEMIA-PRODUCING SUBSTANCE AND PRODUCT.

No Drawing.   Application filed August 23, 1923. Serial No. 659,008.

This invention relates to the preparation of a hypoglycemia producing substance from animal and vegetable material or plant life and consists generally in the extraction of hypoglycemia producing substance with other substances including hyperglycemia producing substance if present from the raw material and the separation and purification of the hypoglycemia producing substance.

The process comprises three main steps as follows: The separation of the hypoglycemia producing substance with other extractable or soluble substances from the animal or vegetable material, the separation of the hypoglycemia producing substance from the bulk of other substances and particularly hyperglycemia producing substance accompanying it in the extract; and the purification of the separated hypoglycemia producing substance.

The extraction of the hypoglycemia producing substance with other substances from the animal or vegetable material may be accomplished by any suitable method and consists generally in the extraction and separation of soluble substances from the insoluble residue or pulp of the raw material under treatment. The separation of the hypoglycemia producing substance from other substances in the extract, and particularly the hyperglycemia producing substance may be accomplished either by salting out or selectively precipitating the hypoglycemia producing substance from the extract or by selectively adsorbing the hypoglycemia producing substance from the extract by means of a solid adsorbent material, such as charcoal, fuller's earth or the like. The purification of the separated hypoglycemia producing substance involves as the principal step the precipitation thereof with a suitable protein-precipitating agent like dinitrosalicylic acid, picric acid, tannic acid, phosphotungstic acid, picramic acid, mercuric chloride, silver nitrate and the like.

As the raw or starting material for the preparation of a hypoglycemia producing substance by the present invention it appears that any protoplasmic material which is capable of metabolizing glucose may be used. Among such materials in addition to animal pancreas and the pancreas of certain bony fishes may be mentioned clams, oysters, yeast and various plants and vegetables such as cabbage, lettuce, onion, potato, wheat, rice, celery, beet roots, oats, etc.

The invention and obvious variations of the process will be apparent to those skilled in the art from the following illustrative example.

Example: One kilogram of fresh cabbage is thoroughly disintegrated for instance by grinding in a mortar with sand and the resulting pulp is triturated with one liter of 95 percent ethyl alcohol which may or may not contain from 0.2 to 0.3 percent of hydrochloric acid. The mixture is permitted to stand for several hours with frequent stirring and is then filtered and the residue pressed to expel the bulk of the residual liquid, the expelled liquid being added to the filtrate. To the combined liquid so obtained there is added a sufficient quantity of ethyl alcohol of say 95 percent to give a solution containing approximately 70 percent of alcohol, which solution is allowed to stand in a cool place, for instance in an ice box, for a number of hours, say over night, after which it is filtered. The filtrate is evaporated under vacuum to a volume of about 75 cc. and extracted with ether to remove fat or oil and then further evaporated to a volume of about 60 cc. to remove ether therefrom. To the 60 cc. of liquid so obtained is added a sufficient quantity of ethyl alcohol of say 95 percent strength to give a solution containing about 80 percent of alcohol, and this solution is allowed to stand in a cool place for a number of hours, say in an ice box over night, after which the clear supernatant liquid is decanted. This liquid when produced as described from cabbage or other plant life contains both hypoglycemia producing and hyperglycemia producing substances, although a liquid similarly prepared from pancreas as the starting material contains the hypoglycemia producing substance almost exclusively. In order to separate the hypoglycemia producing substance from the hyperglycemia producing substance either of the two methods A and B described below may be employed:

(A) The 80 percent alcoholic solution is shaken for from ½ to 1 hour with charcoal in quantity amounting to about 50 grams of charcoal to each liter of the solution, after which the charcoal is separated from the solution and washed several times with 80 percent ethyl alcohol and then dried in vacuum. The filtrate from the charcoal contains practically all of the hyperglycemia producing substance content of the solution, while the charcoal carries almost exclusively the hypoglycemia producing substance content of the solution. In order to recover the hypoglycemia producing substance from the charcoal it is boiled for a short time, say three minutes, with about eight times its weight of glacial acetic acid, the glacial acetic acid solution separated from the charcoal by filtration, the charcoal washed several times with glacial acetic acid, and the washings and filtrate combined. The combined filtrate and washings are then evaporated in vacuum until practically all of the acetic acid is removed and the residue taken up with a little water and the resulting solution neutralized with sodium bicarbonate. The neutral solution so obtained contains in a more or less crude form the substance which, when injected into a normal rabbit produces a decrease in its blood sugar.

In order to purify the crude hypoglycemia producing substance prepared as described the neutralized solution is treated with an excess of a saturated aqueous solution of dinitrosalicylic acid in the usual manner, and the mixture allowed to stand until the precipitation which takes place is complete. The precipitate is separated by filtration or by centrifuging and washed with water and dried in vacuum. On examination of the filtrate after removal of its dinitrosalicylic acid content it is found to be substantially free of hypoglycemia producing substance or properties. The hypoglycemia producing substance or properties are found in the dinitrosalicylic acid precipitate and are recovered therefrom as follows: The precipitate is treated with a small amount of absolute alcohol, say a few cubic centimeters, and a few drops of say 20 percent alcoholic hydrochloric acid solution and then with ether in quantity equal to say five times the volume of absolute alcohol used. The white precipitate formed is separated, washed several times with ether and dried in vacuum. This precipitate when injected into a normal rabbit produces a decrease in its blood sugar ranging as high as 70 percent.

The yield of crude hypoglycemia producing substance from one kilogram of cabbage is about 0.100 gram and of the purified product resulting from the dinitrosalicylic acid purification about 0.010 grams. The hypoglycemia producing activity of the 0.010 gm. of purified product is about equal to that of the 0.100 gm. of crude product.

(B) The 80 percent alcoholic solution prepared as described above is made up to a 93 percent alcohol content by the addition of the necessary quantity of more concentrated alcohol, say 95 percent, and the resulting solution is allowed to stand in a cool place, say in an ice box for several days. A grayish white precipitate weighing about 0.100 grams for each kilogram of cabbage used in preparing the solution settles out and is separated, washed with alcohol and ether and dried in vacuum. This precipitate contains the hypoglycemia producing substance in a somewhat crude form, while the alcoholic solution from which it is separated contains the hyperglycemia producing substance.

For further purifying the hypoglycemia producing substance content of the precipitate it is dissolved in about 10 cc. of water and the solution treated with an excess of a saturated aqueous dinitrosalicylic acid solution in the usual manner and allowed to stand until precipitation is complete. The precipitate is then separated, washed with water and dried in vacuum. The separated solution or mother liquor from the dinitrosalicylic acid precipitation is substantially free of blood-sugar reducing properties. The dinitrosalicylic acid precipitate is treated as described under (A) with a few cubic centimeters of absolute alcohol and a few drops of a 20 percent alcoholic hydrochloric acid solution and then with about five times the amount of ether to complete the precipitation in the known manner. The resulting white precipitate is separated from mother liquor, washed several times with ether and dried in vacuum. This precipitate when injected into a normal rabbit results in a decrease in blood-sugar ranging as high as 70 percent.

One kilogram of cabbage yields about 0.100 grams of the crude hypoglycemia producing substance which by the dinitrosalicylic acid purification gives about 0.010 grams of comparatively pure material having practically the same activity as the 0.100 gram of the crude material.

While we have described the separation and purification of the hypoglycemia producing substance in an alcoholic extract of the raw material, it is to be understood that the separation and purification by means of charcoal or other adsorbent and by means of dinitrosalicylic acid or other precipitant or by means of dinitrosalicylic acid alone as described above is applicable to extracts obtained in other ways. For instance, the separating and purifying process may be applied to the aqueous extract produced as described by Murlin in Proc. Soc. Exp. Biol. Med. 20, 519, 1923. In the use of charcoal it might be applied to the liquid resulting from the filtration of the neutralized $$\frac{N}{5}HCl$$

extract of cabbage described by Murlin and the remainder of the procedure would be as described above under A. Or the salted-out hypoglycemia producing principle prepared as described by Murlin may be dissolved in water and the solution treated as described above under B.

The hypoglycemia producing substance or concentrate produced in accordance with this invention by either of the two methods A and B described above in the form of its hydrochloride, gives positive nitrogen, sulfur, Molisch and biuret tests. The Millon test and also the test for phosphorus give negative results.

The product when injected into rabbits causes a reduction in blood sugar ranging as high as 70 percent with the typical hypoglycæmic convulsions which may be relieved by the injection of glucose.

We claim:

1. Process for the preparation of a hypoglycemia producing substance which comprises contacting a solution containing the same and a hyperglycemia producing substance with a solid insoluble adsorbent material, separating the adsorbent material from the solution, and recovering the hypoglycemia producing substance from the adsorbent material.

2. Process of preparing a hypoglycemia producing substance as defined in claim 1 in which the solid adsorbent material is charcoal.

3. Process of preparing a hypoglycemia producing substance which comprises contacting a solution containing the same and a hyperglycemia producing substance with a solid insoluble adsorbent material, separating the adsorbent material from the solution, and extracting the separated adsorbent material with a solvent for the hypoglycemia producing substance.

4. Process of preparing a hypoglycemia producing substance as defined in claim 3 in which the separated adsorbent material is extracted with glacial acetic acid.

5. Process of preparing a hypoglycemia producing substance which comprises extracting a protoplasmic material other than the mammalian pancreas and related glands of fishes capable of metabolizing glucose with alcohol, removing fat and solid matter from the extract, separating the hypoglycemia producing substance content of said extract from the bulk of the extract including hyperglycemia producing substance by adjusting the alcohol content thereof to about 93%, and separating the resulting precipitate.

6. In the preparation of a hypoglycemia producing substance the step of purifying a crude solution thereof containing also hyperglycemia producing substance which comprises treating the solution with a protein precipitating agent other than alcohol and separating the resulting precipitate.

7. In the preparation of a hypoglycemia producing substance the step of purifying a crude solution thereof containing also hyperglycemia producing substance which comprises treating the solution with a nitrophenol carboxylic acid and separating the resulting precipitate.

8. In the preparation of a hypoglycemia producing substance the step of purifying a crude solution thereof containing also hyperglycemia producing substance which comprises treating the solution with dinitrosalicylic acid and separating the resulting precipitate.

9. Process of preparing a hypoglycemia producing substance which comprises extracting the hypoglycemia producing substance content with other soluble material from a protoplasmic material other than the mammalian pancreas and related glands of fishes capable of metabolizing glucose, selectively removing the hypoglycemia producing substance in crude form from the extract, and purifying the crude hypoglycemia producing substance by precipitation thereof with a protein precipitating agent.

10. Process of preparing a hypoglycemia producing substance which comprises extracting a protoplasmic material capable of metabolizing glucose with alcohol, removing fat and solid matter from the extract, contacting the extract with adsorbent charcoal, separating the charcoal from the extract, digesting the separated charcoal with glacial acetic acid and purifying the resulting crude hypoglycemia producing substance by precipitation with a protein precipitating agent.

11. A hypoglycemia producing substance obtainable by the herein described process which comprises extracting the hyproglycemia producing substance content with other soluble material from a protoplasmic material other than the mammalian pancreas and related glands of fishes capable of metabolizing glucose, selectively removing the hypoglycemia producing substance in crude form from the extract and purifying the crude hypoglycemia producing substance by precipitation thereof with a protein precipitating agent, said substance being a grayish white to almost pure white practically tasteless and odorless powder soluble in acidified water and in alcohol, but insoluble in alkaline solutions, and forming an almost pure white hydrochloride which is soluble in water and is precipitated from its aqueous solution by alkalies.

12. A hypoglycemia producing substance obtainable by the herein described process which comprises extracting a protoplasmic material capable of metabolizing glucose with alcohol, removing fat and solid matter from the extract, contacting the extract with adsorbent charcoal, separating the charcoal from the extract, digesting the separated charcoal with glacial acetic acid and purifying the resulting crude hypoglycemia producing substance by precipitation with a protein precipitating agent, said substance being a grayish white to almost pure white practically tasteless and odorless powder soluble in acidified water and in alcohol, but insoluble in alkaline solutions, and forming an almost pure white hydrochloride which is soluble in water and is precipitated from its aqueous solution by alkalies.

13. A hypoglycemia producing substance obtainable by extracting cabbage with alcohol, contacting the extract with charcoal, digesting the charcoal in glacial acetic acid and separating the resulting solution therefrom, evaporating said solution, dissolving the residue in water and precipitating the hypoglycemia producing substance from the resulting solution by means of dinitrosalicylic acid, said substance being a grayish white to almost pure white practically tasteless and odorless powder soluble in acidified water and in alcohol, but insoluble in alkaline solutions, and forming an almost pure white hydrochloride which is soluble in water and is precipitated from its aqueous solution by alkalies.

In testimony whereof, we affix our signatures.

HARRY E. DUBIN.
HUGH B. CORBITT.